(12) United States Patent
You et al.

(10) Patent No.: US 11,283,379 B2
(45) Date of Patent: Mar. 22, 2022

(54) METHOD AND APPARATUS FOR DETECTING ROTOR MAGNETIC POLE POSITION IN A SINGLE-PHASE BLDC MOTOR

(71) Applicant: LG ELECTRONICS INC., Seoul (KR)

(72) Inventors: Jae Jun You, Seoul (KR); Hansu Jung, Seoul (KR); Jaemin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/903,807

(22) Filed: Jun. 17, 2020

(65) Prior Publication Data
US 2021/0058016 A1 Feb. 25, 2021

(30) Foreign Application Priority Data
Aug. 22, 2019 (KR) .................. 10-2019-0102881

(51) Int. Cl.
*H02P 6/18* (2016.01)
*H02P 6/26* (2016.01)

(52) U.S. Cl.
CPC ............ *H02P 6/183* (2013.01); *H02P 6/26* (2016.02); *H02P 2203/11* (2013.01)

(58) Field of Classification Search
CPC .............................. H02P 6/183; H02P 6/26
USPC ................. 318/400.33, 400.32, 400.01, 700
See application file for complete search history.

(56) References Cited

U.S. PATENT DOCUMENTS

| | | | | |
|---|---|---|---|---|
| 5,780,983 A * | 7/1998 | Shinkawa | ............... | H02P 6/182 318/400.04 |
| 6,121,736 A * | 9/2000 | Narazaki | ................. | H02P 6/182 318/400.02 |
| 9,515,589 B2 * | 12/2016 | Kozaki | ............... | F04D 15/0066 |
| 2005/0253546 A1 | 11/2005 | Dornhof | | |
| 2018/0241333 A1 | 8/2018 | Sakai | | |

FOREIGN PATENT DOCUMENTS

| | | |
|---|---|---|
| CN | 106160596 A | 11/2016 |
| EP | 3 226 403 A1 | 10/2017 |
| GB | 2500013 A | 9/2013 |
| KR | 10-0442754 B1 | 7/2004 |
| KR | 10-1256858 | 4/2013 |
| KR | 10-2015-0111736 | 10/2015 |
| KR | 10-2017-0126639 A | 11/2017 |

OTHER PUBLICATIONS

Korean Office Action dated Apr. 15, 2021 issued in Application 10-2019-0102881 and English translation.
(Continued)

*Primary Examiner* — David Luo
(74) *Attorney, Agent, or Firm* — KED & Associates LLP

(57) ABSTRACT

A method and an apparatus may detect a rotor magnetic pole of a single-phase BLDC motor. The method and apparatus may quickly and precisely initially drive the single-phase BLDC motor by detecting a position of a magnetic pole of a rotor adjacent to a stator by applying a high frequency voltage to the single-phase BLDC motor and analyzing a magnitude of a flowing current.

19 Claims, 11 Drawing Sheets

(56) References Cited

OTHER PUBLICATIONS

Seon-Hwan Hwang et al., "Initial Rotor Position Detection of Single-phase Permanent Magnet Synchronous Motor using Offset Voltage," Journal of IKEEE, vol. 23, No. 2, 622-627, Jun. 2019.
June-Woo Jo et al., "A Study on a Control Method for Small BLDC Motor Sensorless Drive and the Single Phase BEMF and the Neutral Point," Journal of the KIEEE, vol. 28, No. 9, 1-7, Sep. 2014.
Extended European Search Report dated Dec. 10, 2020 issued in Application 20180209.7.

* cited by examiner $$L = \frac{N\Phi}{I} [H] \Longrightarrow N\emptyset = \lambda = L * I$$

L : SELF-INDUCTANCE [H]
N : NUMBER OF TURNS
Φ : MAGNETIC FLUX [Wb]
I : CURRENT [A]
λ : FLUX LINKAGE [Wb]

<METHOD OF APPLYING HIGH FREQUENCY VOLTAGE USING LOW PASS FILTER>

METHOD AND APPARATUS FOR DETECTING ROTOR MAGNETIC POLE POSITION IN A SINGLE-PHASE BLDC MOTOR

CROSS-REFERENCE TO RELATED APPLICATION

Pursuant to 35 U.S.C. § 119(a), this application claims the benefit of an earlier filing date and right of priority to Korean Application No. 10-2019-0102881, filed in Korea on Aug. 22, 2019, the subject matter of which is hereby incorporated by reference.

BACKGROUND

1. Field

The present disclosure relates to a method and an apparatus for detecting a position of a magnetic pole of a rotor of a single-phase BLDC (brushless direct current) motor, and more particularly, to a method and an apparatus for detecting a position of a magnetic pole of a rotor permanent magnet by analyzing a waveform of a current flowing when a high frequency voltage is applied to a single-phase BLDC motor.

2. Background

An electric motor may use an electromagnetic force, and may be configured by a stator which is fixed and a rotor which rotates at an inside or an outside of the stator by the electromagnetic force. A DC commutator motor, which is a type of electric motor, may control direction of the electromagnetic force based on action of a commutator and a brush, and may control a rotating direction of the rotor. However, the DC commutator motor may have a brush that becomes worn, and an electrical or mechanical noise may be generated.

A brushless DC (BLDC) electric motor is a motor that may compensate for the above shortcomings of the DC commutator motor. The DC commutator motor is configured to control the direction of the electromagnetic force by controlling the direction of current flowing in a rotor coil with a mechanical switch that uses a commutator and a brush. On the other hand, the BLDC motor rotates the rotor using magnetic attractive and repulsive forces by controlling a direction of the current flowing in a stator coil with an electrical switch that uses a driving circuit.

Since the BLDC motor does not have a brush, the brush wearing issue does not arise and the electrical or mechanical noise may be low. However, in order to drive a rotor of a motor that has stopped by specifying a rotating direction (hereinafter referred to as an initial driving), a position of an N pole or an S pole (hereinafter referred to as a magnetic pole) of a rotor permanent magnet may need to be detected (i.e., detection of a position of a rotor magnetic pole). A timing at which to apply current flowing in a coil may need to be controlled based on the position of the magnetic pole of the rotor permanent magnet.

As related art, Korean Patent Registration No. 10-1256858, the subject matter of which is incorporated herein by reference, discloses a DC motor that detects a position of a rotor permanent magnet using a position detecting device, such as a Hall sensor. The Hall sensor may determine whether the magnetic field is an N pole or an S pole by measuring an electromotive force (i.e., a Hall voltage) generated by allowing current to flow in a compound semiconductor and applying a magnetic field at a right angle. Therefore, the position of the magnetic pole of the rotor permanent magnet may be detected by measuring the electromotive force (i.e., Hall voltage) based on the magnetic field of the rotor permanent magnet.

However, when a position detecting sensor (such as a Hall sensor) is installed, the manufacturing cost of the BLDC motor may increase. A space for installing the position detecting sensor may be required, resulting in space utilization efficiency being degraded, which may make it difficult to reduce the size of the motor.

In order to address the above issues, a method and an apparatus for detecting a position of a rotor magnetic pole of a BLDC motor without providing a position detecting sensor (i.e., a sensor-less type) are being studied.

Another related art, Korean Patent Application Publication No. 10-2015-0111736, the subject matter of which is incorporated herein by reference, discloses a method for driving a sensor-less BLDC motor that detects a position of a rotor magnetic pole by detecting a reverse electromotive force of one phase where no current flows.

However, since reverse electromotive force is not generated when the rotor is not rotating, in order to determine the initial driving direction of the motor, the motor is arbitrarily driven to generate the reverse electromotive force to detect the rotating direction of the rotor, and then a rotating direction of the rotor is controlled using power switching. Therefore, in order to drive the motor in a desired rotating direction, an initial driving time may be prolonged.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
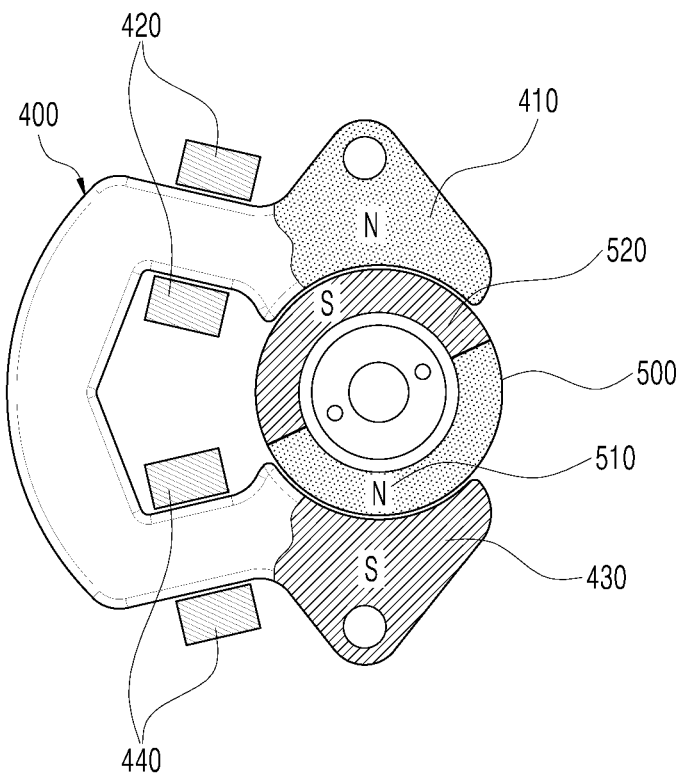
FIG. 1 is a view illustrating an example of a single-phase BLDC motor.

FIG. 1 is a view illustrating an example of a single-phase BLDC motor. This example may describe a configuration of a single-phase BLDC motor (hereinafter referred to as a BLDC motor) and a method for detecting a rotor magnetic pole of a single-phase BLDC motor.

The BLDC motor may include a stator 400 and a rotor 500. The stator 400 may rotate the rotor 500 by magnetic attractive force and repulsive force. The stator 400 may include a first stator 410, a first coil 420 wound around the first stator 410, a second stator 430, and a second coil 440 wound around the second stator 430.

The first coil 420 and the second coil 440 are connected to each other, and a current supplied to the BLDC motor may flow therethrough. When the first coil 420 and the second coil 440 are connected and operated, a phase number of the motor, which is the number of coils that operate independently, becomes one, and the BLDC motor may thereby become a single-phase BLDC motor.

The first stator 410 and the second stator 430 (hereinafter referred to as stators) may become an electromagnet having an N pole or an S pole depending on direction of the current flowing in the first coil 420 and the second coil 440. When the first stator 410 and the second stator 430 are an electromagnet, the first stator 410 and the second stator 430 may be configured to have different magnetic poles. For example, when current flows in the first coil 420 and the second coil 440, the first stator 410 may have an N pole and the second stator 430 may have an S pole.

The rotor 500 may have a cylindrical or spherical shape, and may include a rotor N pole 510 having an N pole and a rotor S pole 520 having an S pole such that the rotor 500 rotates by torque caused by an attractive force or a repulsive force with the stator magnetic poles. For example, when the first stator 410 has an N pole, the second stator 430 has an S pole, the rotor N pole 510 is adjacent to the second stator 430 at an incline in a counterclockwise direction, and the rotor S pole 520 is adjacent to the first stator 410 at an incline in the counterclockwise direction, the rotor 500 may start rotating in a clockwise direction. This is because the magnetic attractive force works on the N pole of the first stator 410 and the rotor S pole 520 in the clockwise direction, and the magnetic attractive force works on the S pole of the second stator 430 and the rotor N pole 510 in the clockwise direction.

According to this principle, the magnetic pole of the first stator 410 and the magnetic pole of the second stator 430 sequentially change, such that the magnetic attractive force or repulsive force appropriately works on the magnetic pole of the rotor 500 to rotate the rotor 500.

Figure 2:
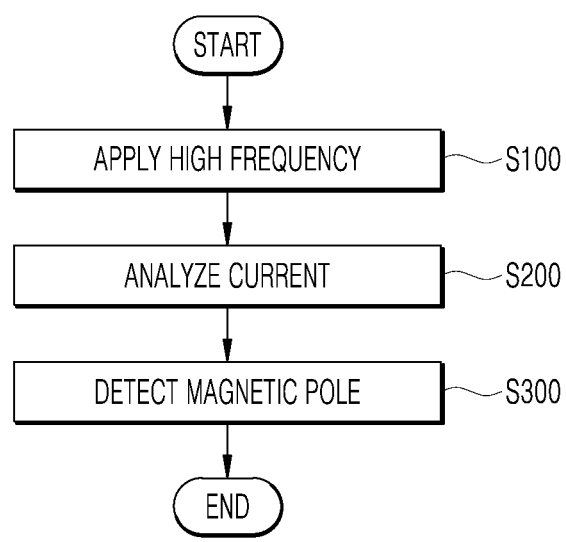
FIG. 2 is a flowchart illustrating an example of a method for detecting a position of a rotor magnetic pole of a single-phase BLDC motor of the present disclosure.

A method for detecting a rotor magnetic pole of a single-phase BLDC motor according to an example embodiment may be described. FIG. 2 is a flowchart illustrating an example of a method for detecting a position of a rotor magnetic pole of a single-phase BLDC motor.

FIG. 2 shows a method for detecting a magnetic pole of the rotor 500 that is adjacent to the first stator 410 and the second stator 430 in order to control a rotating direction when the BLDC motor that is stopped is initially driven (i.e., an initial rotating direction). The method may include a high frequency applying step S100 that applies a high frequency voltage, a current analyzing step S200 that analyzes an offset current, and a magnetic pole detecting step S300 that detects (or determines) a position of a magnetic pole.

Figure 3:
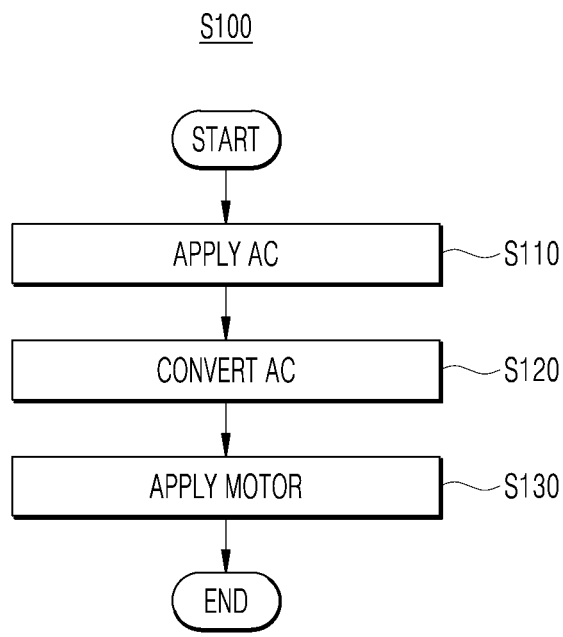
FIG. 3 is a flowchart illustrating an example of a high frequency applying step of FIG. 2.

FIG. 3 is a flowchart illustrating an example of the high frequency applying step (of FIG. 2). The high frequency applying step S100 may include an AC applying step S110 that applies a high frequency voltage and an AC voltage to the BLDC motor, an AC converting step S120 that converts the AC voltage into a high frequency voltage, and a motor that applying step S130 that applies a high frequency voltage to the motor.

In the AC applying step S110, an AC voltage is applied to a converter. The applied AC voltage may be converted into a voltage appropriate for detecting a position of a rotor magnetic pole of the BLDC motor.

In the AC converting step S120, the applied AC voltage (applied to the converter) is converted into a high frequency voltage. The converter may convert the applied voltage into an AC voltage or a DC voltage, and/or the converter may convert a frequency of the applied voltage. The high frequency voltage used for detecting the rotor magnetic pole may have a frequency of 500 Hz or higher.

In the motor applying step S130, in order for the current to flow into the BLDC motor when the rotor 500 is stopped and is not rotating, the high frequency voltage is applied to the BLDC motor. Specifically, when the high frequency voltage is applied to the BLDC motor, the direction of the current flowing into the BLDC motor is rapidly alternately switched, such that the magnetic poles of the first stator 410 and the second stator 430 are also rapidly alternately switched. Accordingly, the rotor 500 does not receive a magnetic attractive force or repulsive force, which is torque for rotation, for a sufficient time to be rotated, and thus the rotor 500 does not rotate but is maintained in a stopped state. Therefore, the position of the magnetic pole of the rotor 500 that is detected by applying a voltage to the BLDC motor may be maintained to be the same before and after applying the voltage.

Figure 4:
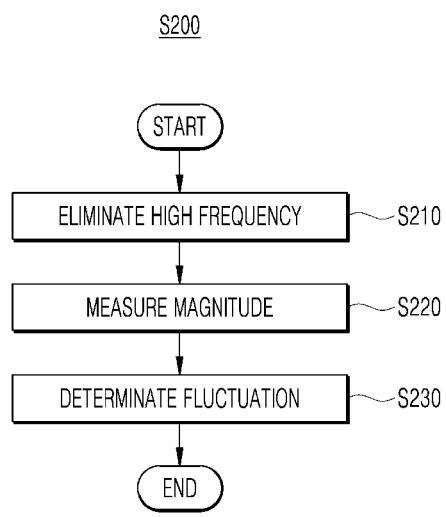
FIG. 4 is a flowchart illustrating an example of a current analyzing step of FIG. 2.

FIG. 4 is a flowchart illustrating an example of the current analyzing step (of FIG. 2). The current analyzing step S200 may include a high frequency eliminating step S210 that analyzes a characteristic of a current flowing in the BLDC motor (i.e., an offset current) in order to detect a magnetic pole of the rotor 500 adjacent to the stator, and blocking or attenuating a high frequency component of the offset current (i.e., eliminating a high frequency component). The current analyzing step S200 may further include a magnitude measuring step S220 that measures a magnitude of the offset current and a fluctuation determining step S230 that determines an increasing direction of the offset current.

The offset current is analyzed to detect a position of the magnetic pole of the rotor 500 adjacent to the stator by measuring a change in a magnitude of the offset current. When current flows in the BLDC motor, the magnitude of the offset current is changed due to the influence of the magnetic pole of the rotor 500 adjacent to the stator.

In the high frequency eliminating step S210, a high frequency component of the offset current is eliminated. When the high frequency voltage is applied to the BLDC motor, the offset current also includes a high frequency component, and the offset current thus has a complicated shape. Therefore, when the high frequency component of the offset current is eliminated, the offset current has a simple shape, and the characteristic of the offset current may thus be more easily determined.

In the high frequency applying step S100, when a voltage having a frequency of 500 Hz or higher is applied to the BLDC motor, if a component having a specific frequency or higher is eliminated in the high frequency eliminating step S210, the specific frequency is desirably 500 Hz or lower.

Figure 5:
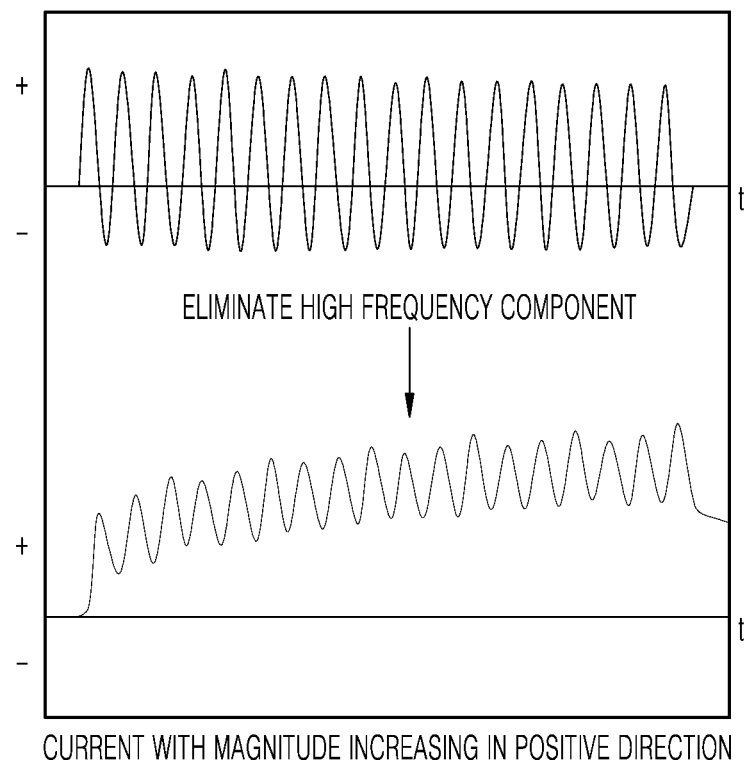
FIG. 5 is a view illustrating an example of a waveform of an offset current of which the magnitude is increased in a positive direction.
Figure 6:
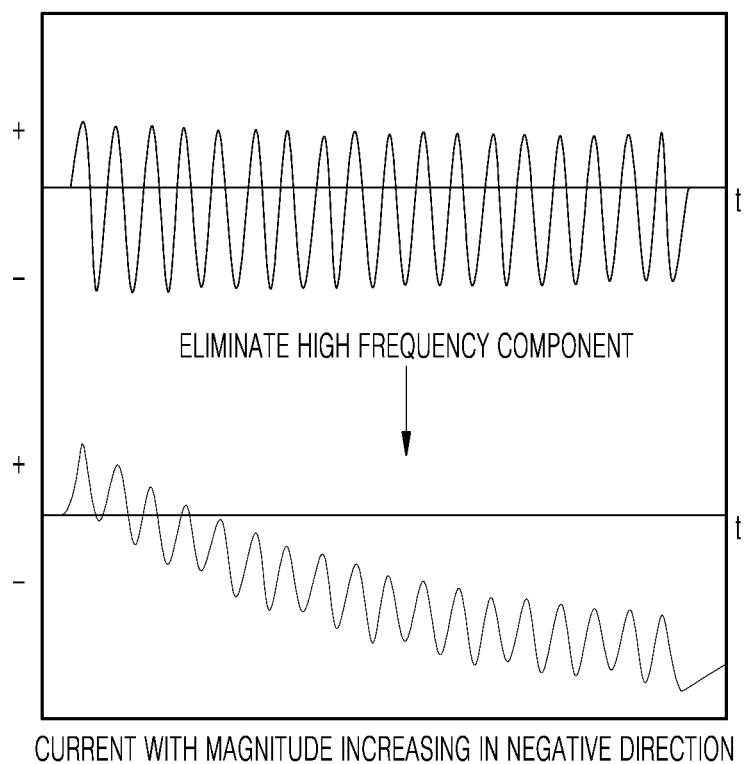
FIG. 6 is a view illustrating an example of a waveform of an offset current of which the magnitude is increased in a negative direction.

FIG. 5 is a view illustrating an example of a waveform of an offset current of which the magnitude is increased in a positive direction. FIG. 6 is a view illustrating an example of a waveform of an offset current of which the magnitude is increased in a negative direction.

More specifically, when the offset current is passed through a high frequency eliminator (such as a filter) so as to eliminate a high frequency component of the offset current, as illustrated in the graphs shown in lower portions of FIGS. 5 and 6, a waveform that represents the characteristic of the offset current is illustrated, and the characteristic of the offset current may thus be more easily identified. The filter may be a low pass filter of a first order or a higher order.

In the magnitude measuring step S220, a magnitude of the offset current is measured. Since the offset current is an alternating current, the direction thereof changes according to a predetermined cycle. For example, as shown in FIGS. 5 and 6, the offset current may flow while changing direction to a positive direction (+) and a negative direction (−) according to a predetermined cycle over time (t).

Therefore, in the magnitude measuring step S220, as shown in FIGS. 5 and 6, the offset current is graphed in terms of displacement over time (t) to measure a magnitude of the offset current in a positive direction (+) or a magnitude in a negative direction (−). When the magnitude measuring step S220 is performed after the high frequency eliminating step S210, the offset current may be graphed as shown in the lower portions of FIGS. 5 and 6.

The order of the magnitude measuring step S220 and the high frequency eliminating step S210 may be switched (or changed). For example, when the high frequency eliminating step S210 is performed after measuring the magnitude of the offset current in the magnitude measuring step S220, the graphs shown in the upper portions of FIGS. 5 and 6 may be shown first, and the graphs shown in the lower portions of FIGS. 5 and 6 (obtained by eliminating a high frequency component of the offset current) may be shown thereafter.

In the fluctuation determining step S230, an increased or decreased direction of the magnitude of the offset current is determined based on the magnitude of the offset current measured in the magnitude measuring step S220.

For example, referring to FIG. 5, it may be determined that the magnitude of the offset current is increased in a positive direction (+) (or decreased in a negative direction (−)) as compared with a general alternating current. The change in the magnitude of the offset current may be determined using the graph shown in the upper portion of FIG. 5, which is obtained without performing the high frequency eliminating step S210, or may more efficiently be determined using the graph shown in the lower portion of FIG. 5 which is obtained by performing the high frequency eliminating step S210.

As another example, referring to FIG. 6, it may be determined that the magnitude of the offset current is increased in a negative direction (−) (or decreased in a positive direction (+)) as compared with a general alternating current. The change in the magnitude of the offset current may be determined using the graph shown in the upper portion of FIG. 6, which is obtained without performing the high frequency eliminating step S210, or may more efficiently be determined using the graph shown in the lower portion of FIG. 6 which is obtained by performing the high frequency eliminating step S210.

Figure 7:
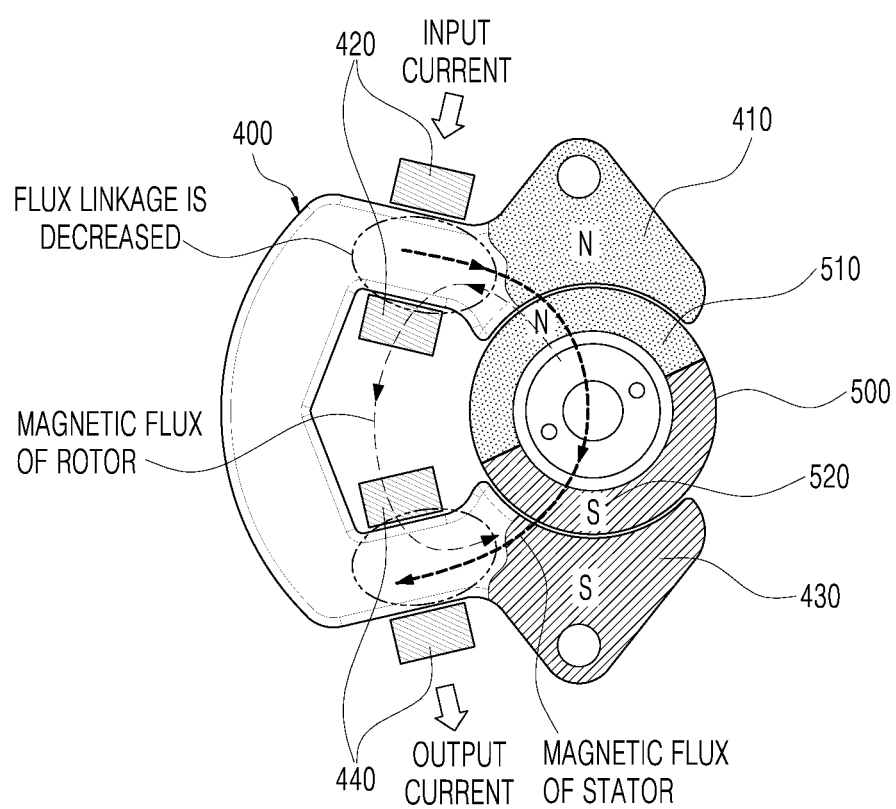
FIG. 7 is a view illustrating a magnetic flux when a stator magnetic pole formed by a current flowing in a specific direction is the same as a magnetic pole of an adjacent rotor.
Figure 8:
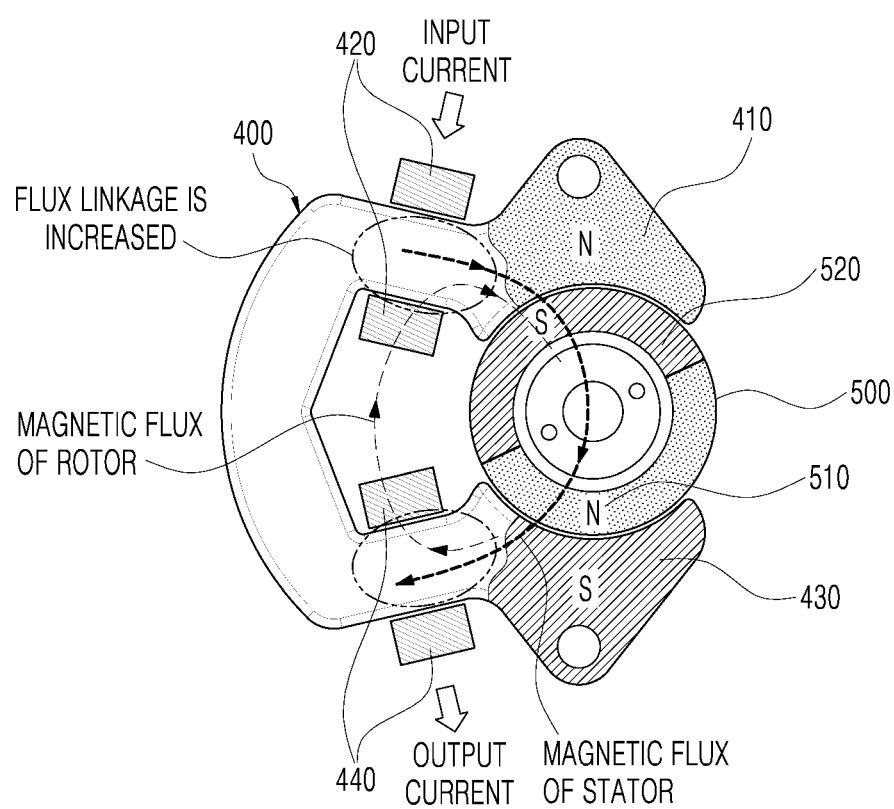
FIG. 8 is a view illustrating a magnetic flux when a stator magnetic pole formed by a current flowing in a specific direction is different from a magnetic pole of an adjacent rotor.
Figure 9:
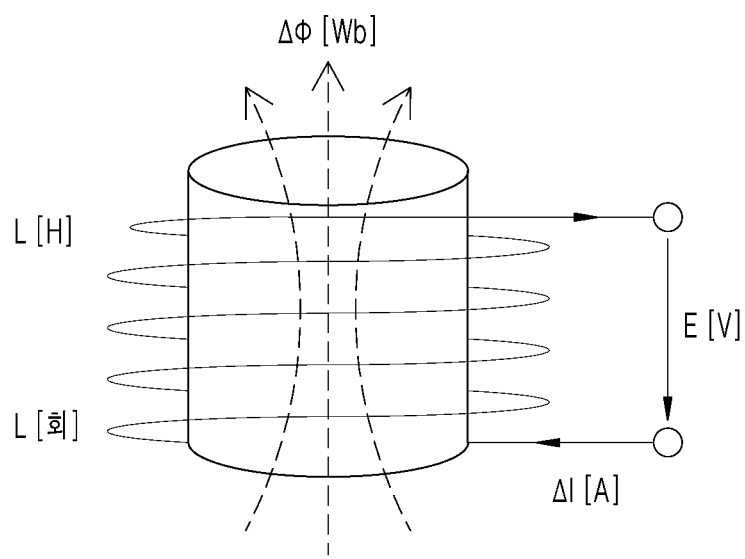
FIG. 9 is a view illustrating a relationship between a current flowing in a coil and a flux linkage.
Figure 10:
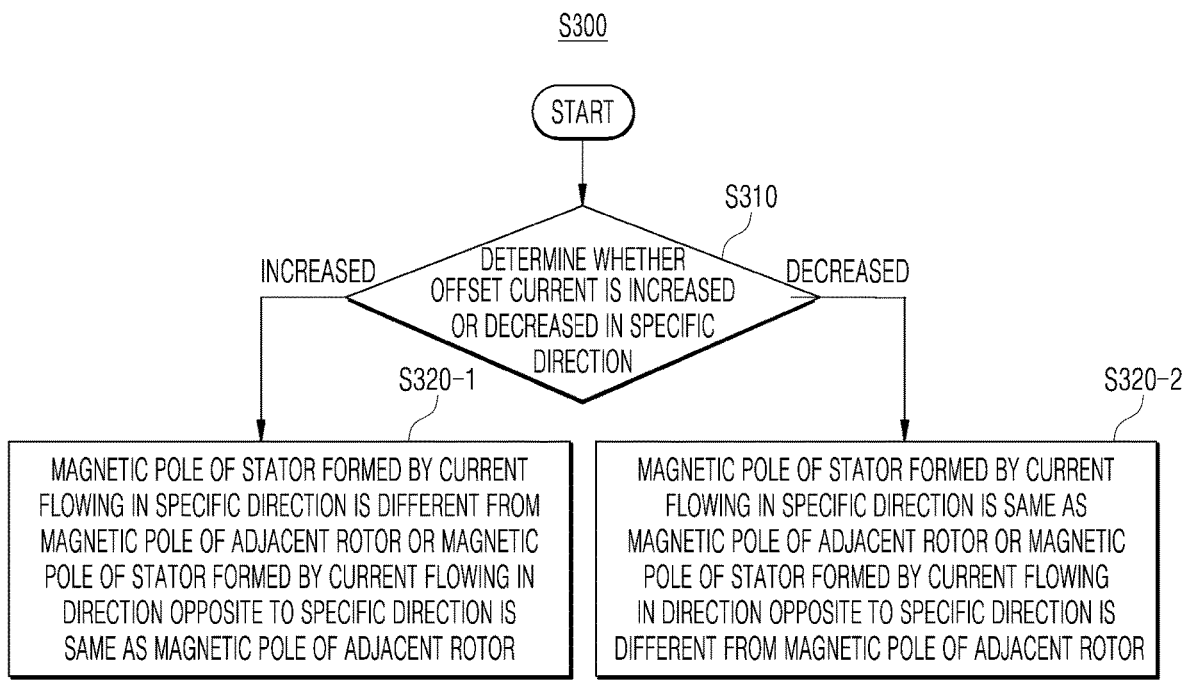
FIG. 10 is a flowchart illustrating a magnetic pole detecting step of FIG. 2.

FIG. 7 is a view illustrating a magnetic flux when a stator magnetic pole formed by a current flowing in a specific direction is the same as a magnetic pole of an adjacent rotor. FIG. 8 is a view illustrating a magnetic flux when a stator magnetic pole formed by a current flowing in a specific direction is different from a magnetic pole of an adjacent rotor. FIG. 9 is a view illustrating a relationship between a current flowing in a coil and a flux linkage. FIG. 10 is a flowchart illustrating a magnetic pole detecting step of FIG. 2.

The magnetic pole detecting step S300 will be described with reference to FIGS. 7 to 10. In the magnetic pole detecting step S300, it is determined whether the magnetic pole of the rotor 500 adjacent to the stator is an N pole or an S pole using a fluctuation direction of the magnitude of the offset current.

First, an influence of the magnetic pole of the rotor 500 on a magnetic flux formed in a coil wound around the stator will be described with reference to FIGS. 7 and 8. Referring to FIG. 7, when current flows in the first coil 420 so that the first stator 410 has an N pole and current flows in the second coil 440 so that the second stator 430 has an S pole, a stator magnetic flux may be formed in the direction as illustrated in FIG. 7. Further, when the rotor N pole 510 is adjacent to the N pole of the first stator 410 and the rotor S pole 520 is adjacent to the S pole of the second stator 430, the rotor magnetic flux may be formed in the direction as illustrated in FIG. 7.

When the magnetic flux is formed as shown in FIG. 7, the stator magnetic flux and the rotor magnetic flux which interlink in the first coil 420 and the second coil 440 respectively interlink with each other in opposite directions, such that the flux linkage of the first coil 420 and the second coil 440 is reduced.

Referring to FIG. 8, when current flows in the first coil 420 so that the first stator 410 has an N pole and current flows in the second coil 440 so that the second stator 430 has an S pole, a stator magnetic flux may be formed in the direction as shown in FIG. 8. Further, when the rotor S pole 520 is adjacent to the N pole of the first stator 410 and the rotor N pole 510 is adjacent to the S pole of the second stator 430, the rotor magnetic flux may be formed in the direction as shown in FIG. 8.

When the magnetic flux is formed as shown in FIG. 8, the stator magnetic flux and the rotor magnetic flux which interlink in the first coil 420 and the second coil 440 respectively interlink with each other in the same direction, such that the flux linkage of the first coil 420 and the second coil 440 are increased.

As a result, when the magnetic pole of the stator (formed by the current flowing in a specific direction) is the same as the magnetic pole of the adjacent rotor, the flux linkage of the first coil 420 and the second coil 440 is decreased. Additionally, when the magnetic pole of the stator (formed by the current flowing in a specific direction) is different from the magnetic pole of the adjacent rotor, then the flux linkage of the first coil 420 and the second coil 440 is increased.

The influence of the flux linkage on the current flowing in the coil will be described. Referring to FIG. 9, when a current I flows through a coil which is wound around an iron core N times and has a self-inductance L, a magnetic flux Φ may be formed. In this example, a value obtained by multiplying the number N of turns that the coil is wound around the iron core and the magnetic flux Φ is a flux linkage λ. The flux linkage λ may be represented by the product of the inductance L and the current I flowing in the coil.

Therefore, since the flux linkage and the current flowing in the coil are proportional, when the flux linkage is reduced, the current flowing in the first coil 420 and the second coil 440 is reduced, and when the flux linkage is increased, the current flowing in the first coil 420 and the second coil 440 is increased.

A method for detecting a magnetic pole of the rotor adjacent to the stator using a fluctuation direction of the magnitude of the offset current will be described with reference to FIG. 10. In the magnetic pole detecting step S300, the polarity of the stator and the rotor 500 adjacent to the stator may be detected (or determined) based on whether the offset current is increased in a specific direction as determined in the current analyzing step S200 (S320-1 and S320-2).

For example, an increase in the magnitude of the offset current in a specific direction A (for example, a positive direction (+) or a negative direction (−)) is due to the flux linkage of the first coil 420 and the second coil 440 being increased when the current flows in the specific direction A. Therefore, the magnetic pole of the stator formed when the offset current flows in the specific direction A may be detected (or determined) to be different from the magnetic pole of the rotor 500 adjacent to the stator (S320-1). In other words, the magnetic pole of the stator formed when the offset current flows in an opposite direction to the specific direction A may be detected to be the same as the magnetic pole of the rotor 500 adjacent to the stator (S320-1).

More specifically, in response to an increase in the magnitude of the offset current in the specific direction A and the offset current flowing in the specific direction A, if the first stator 410 has an N pole, the rotor S pole is detected to be adjacent to the first stator 410.

As another example, a decrease in the magnitude of the offset current in a specific direction B (for example, a positive direction (+) or a negative direction (−)) is due to the flux linkage of the first coil 420 and the second coil 440 being decreased when the current flows in the specific direction B. Therefore, the magnetic pole of the stator formed when the offset current flows in the specific direction B may be detected to be the same as the magnetic pole of the rotor 500 adjacent to the stator (S320-2). In other words, the magnetic pole of the stator formed when the offset current flows in an opposite direction to the specific direction B may be detected to be different from the magnetic pole of the rotor 500 adjacent to the stator (S320-2).

More specifically, in response to a decrease in the magnitude of the offset current in the specific direction B and the offset current flowing in the specific direction B, if the first stator 410 has an N pole, the rotor N pole is detected to be adjacent to the first stator 410.

When the position of the magnetic pole of the rotor 500 is detected in the magnetic pole detecting step S300, the rotor 500 may be aligned by being rotated as little as possible, after which the BLDC motor may be initially driven.

More specifically, the magnetic pole of the rotor 500 which is adjacent to the stator and is stopped may be detected, and the rotor 500 may be aligned by being rotated as little as possible by controlling the stator to have a magnetic pole different from the detected magnetic pole of the rotor 500.

The aligned rotor 500 may be rotated by receiving torque caused by the magnetic attractive force or repulsive force in a clockwise direction or a counterclockwise direction in accordance with the conversion of the magnetic pole of the stator.

When the rotor 500 is aligned by forming an arbitrary magnetic pole of the stator without detecting a magnetic pole position of the stator 500, if the magnetic pole formed in the stator is the same as the magnetic pole of the rotor 500, the rotor 500 is aligned after rotating until a magnetic pole different from the magnetic pole formed in the stator is adjacent to the stator. Therefore, it may take more time to align the rotor 500 to initially drive the BLDC motor.

Accordingly, by detecting the magnetic pole of the rotor 500 adjacent to the stator, the aligning time of the rotor 500 to initially drive the BLDC motor can be shortened, and machines that use the BLDC motor can be more precisely controlled. Further, by aligning the rotor 500 by rotating the rotor 500 as little as possible, mechanical noise and electrical noise caused by the initial driving of the BLDC motor may be reduced.

Figure 11:
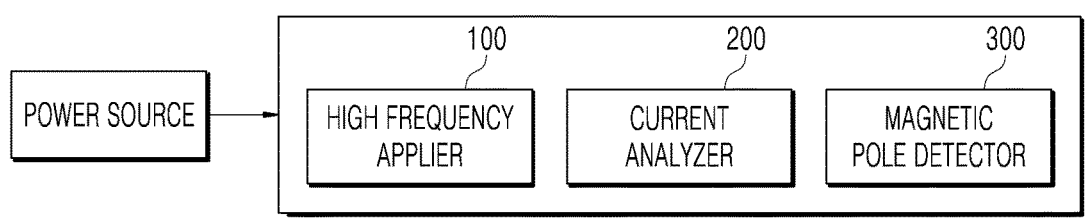
FIG. 11 is a block diagram illustrating an example of an apparatus for detecting a position of a rotor magnetic pole of a single-phase BLDC motor of the present disclosure.

An apparatus for detecting a rotor magnetic pole of a single-phase BLDC motor according to an example embodiment may be described. FIG. 11 is a block diagram showing an apparatus for detecting a position of a rotor magnetic pole of a single-phase BLDC motor. An apparatus 10 for detecting a rotor magnetic pole of a single-phase BLDC motor is an apparatus for detecting a magnetic pole of the rotor 500 that is adjacent to the first stator 410 and the second stator 430, in order to control a rotating direction when a BLDC motor that is stopped is initially driven. The apparatus 10 may include a high frequency applier 100 that applies a high frequency voltage, a current analyzer 200 that analyzes an offset current, and a magnetic pole detector 300 that detects a position of a magnetic pole.

Figure 12:
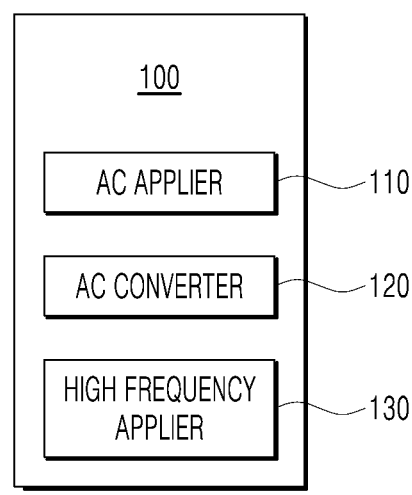
FIG. 12 is a block diagram illustrating an example of a high frequency applier of FIG. 11.

FIG. 12 is a block diagram illustrating the high frequency applier (of FIG. 11). The high frequency applier 100 may include an AC applier 110 that applies a high frequency voltage to the BLDC motor and applies an AC voltage, an AC converter 120 that converts the AC voltage into a high frequency voltage, and a motor applier 130 (or high frequency applier) that applies a high frequency voltage to a motor.

The AC applier 110 applies an AC voltage to a converter. The AC voltage that is applied to the converter may be converted into a voltage appropriate for detecting a position of a rotor magnetic pole of the BLDC motor.

The AC converter 120 converts the AC voltage (applied to the converter) into a high frequency voltage. The converter may convert an applied voltage into an AC voltage or a DC voltage or may convert a frequency of the applied voltage. The high frequency voltage to be used for the apparatus 10 for detecting a rotor magnetic pole of the single-phase BLDC motor may have a frequency of 500 Hz or higher.

The motor applier 130 applies the high frequency voltage to the BLDC motor to allow current to flow into the BLDC motor when the rotor 500 is stopped and is not rotating.

The specific description of the structure in which the rotor 500 does not rotate when the high frequency voltage is applied to the BLDC motor and the current flows is the same as the above description of the method for detecting a rotor magnetic pole of the single-phase BLDC motor.

Figure 13:
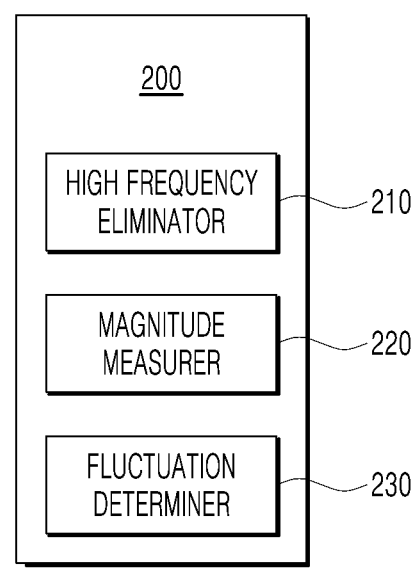
FIG. 13 is a block diagram of an example of a current analyzer of FIG. 11.

FIG. 13 is a block diagram of an example of the current analyzer (of FIG. 11). The current analyzer 200 may include a high frequency eliminator 210 that analyzes a characteristic of a current flowing in the BLDC motor (i.e., an offset current) in order to detect the magnetic pole of the rotor 500 adjacent to the stator, and eliminates a high frequency component of the offset current. The current analyzer may further include a magnitude measurer 220 that measures a magnitude of the offset current, and a fluctuation determiner 230 that determines a fluctuation direction of the offset current. The analysis of the offset current as described above is the same as the above described in method for detecting a rotor magnetic pole of the single-phase BLDC motor.

The high frequency eliminator 210 may eliminate a high frequency component of the offset current. When the high frequency voltage is applied to the BLDC motor, the offset current also includes a high frequency component, and thus the offset current has a complicated shape. Therefore, when the high frequency component of the offset current is eliminated, the offset current has a simple shape, and the characteristic of the offset current may be more easily determined.

When the high frequency applier 100 applies a voltage having a frequency of 500 Hz or higher to the BLDC motor, if a component having a specific frequency or higher is eliminated by the high frequency eliminator 210, then the specific frequency is desirably 500 Hz or lower.

The specific description of a configuration of eliminating the high frequency component of the offset current so as to easily identify the characteristic of the offset current is the same as the above description for the method for detecting a rotor magnetic pole of the single-phase BLDC motor.

The magnitude measurer 220 may measure the magnitude of the offset current. Since the offset current is an alternating current, the direction thereof changes according to a predetermined cycle. For example, as shown in FIGS. 5 and 6, the offset current may flow while changing direction to a positive direction (+) and a negative direction (-) according to a predetermined cycle over time (t).

Therefore, the magnitude measurer 220, as shown in FIGS. 5 and 6, provides a graph of the offset current in terms of displacement over time (t) to measure a magnitude of the offset current in a positive direction (+) or a magnitude in a negative direction (-). The offset current may be shown as the graphs shown in lower portions of FIGS. 5 and 6 by the high frequency eliminator 210 and the magnitude measurer 220.

The fluctuation determiner 230 determines an increasing or decreasing direction of a magnitude of the offset current based on the magnitude of the offset current measured by the magnitude measurer 220.

The specific description of a configuration of determining a fluctuation direction of the magnitude of the offset current based on the magnitude of the offset current is the same as the above description for the method for detecting a rotor magnetic pole of the single-phase BLDC motor.

The magnetic pole detector 300 may be described with reference to FIGS. 7 to 9. The magnetic pole detector 300 may determine whether the magnetic pole of the rotor 500 adjacent to the stator is an N pole or an S pole based on a fluctuation direction of the magnitude of the offset current.

The magnetic pole detector 300 may detect a magnetic pole of the rotor 500 using the principle that the magnitude of the offset current varies in accordance with the magnetic pole of the rotor 500, the detailed description of which is the same as the above description of the method for detecting a rotor magnetic pole of the single-phase BLDC motor.

The rotor 500 may be aligned and the BLDC motor may be driven using the detected magnetic pole of the rotor 500, the detailed description of which is the same as the above description of the method for detecting a rotor magnetic pole of the single-phase BLDC motor.

Another embodiment of an apparatus for detecting a rotor magnetic pole of a single-phase BLDC motor using a first order low pass filter may be described.

Figure 15:
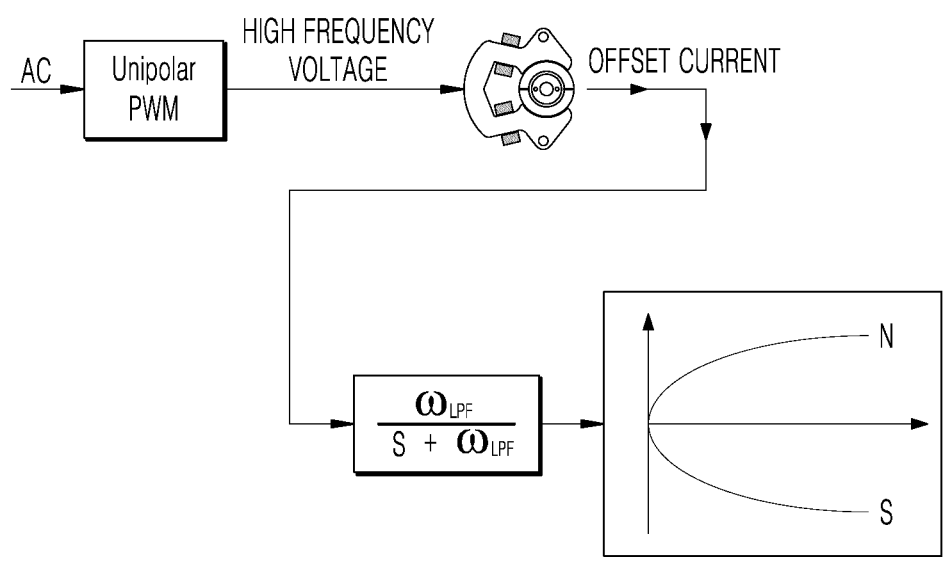
FIG. 15 is a view illustrating an example of a device of FIG. 11 which uses a first order low pass filter.

FIG. 15 is a view illustrating an example of an apparatus of FIG. 11 which uses a first order low pass filter. The apparatus for detecting a rotor magnetic pole of a single-phase BLDC motor may apply a high frequency voltage to the BLDC motor, pass the offset current output from the BLDC motor through the first order low pass filter, and then measure the offset current using a measurer (or measuring device).

The measurer may measure a characteristic of the offset current which passes through the first order low pass filter, and similar to the magnitude measurer 220 described above may represent the offset current as a graph by measuring a magnitude of the offset current.

The position of the rotor magnetic pole of the BLDC motor may be detected by devices that perform the same functions as the current analyzer 200 and the magnetic pole detector 300 of the apparatus for detecting a position of a rotor magnetic pole of a single-phase BLDC motor described above based on the offset current measured by the measurer. The BLDC motor may be driven using the detected position of the rotor magnetic pole of the BLDC motor.

Operations and effects of the method and apparatus for detecting a rotor magnetic pole of a single-phase BLDC motor according to an example embodiment may be described.

Figure 14:
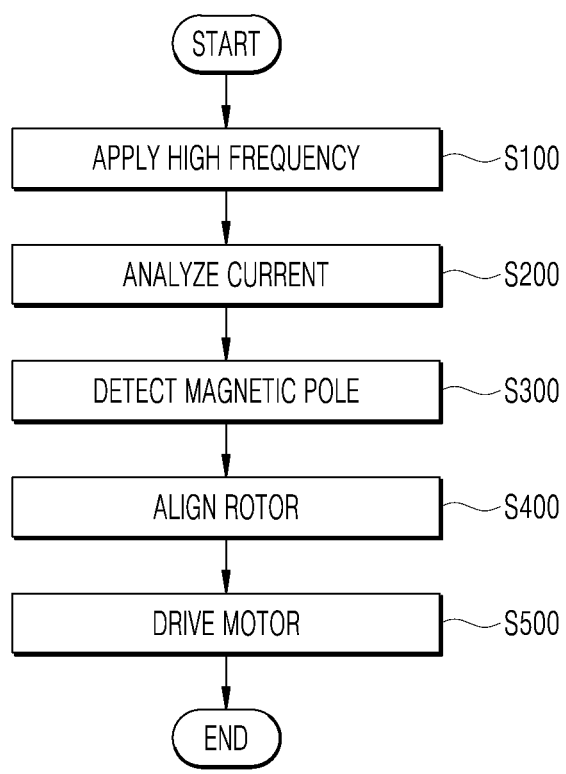
FIG. 14 is a flowchart illustrating an example of an action of a single-phase BLDC motor that is driven by a method and an apparatus for detecting a position of a rotor magnetic pole of a single-phase BLDC motor of the present disclosure.

FIG. 14 is a flowchart illustrating an example of an action of a single-phase BLDC motor that is driven by a method and an apparatus for detecting a position of a rotor magnetic pole of a single-phase BLDC motor. An action of driving the BLDC motor by a method and apparatus for detecting a position of a rotor magnetic pole of a single-phase BLDC motor may be described with reference to FIG. 14.

A high frequency voltage is applied to the BLDC motor so as to enable detection of a magnetic pole of the rotor adjacent to the stator while the rotor is not rotating (S100).

The magnitude of the offset current flowing in the BLDC motor by the applied high frequency voltage is measured, and the offset current is analyzed by determining whether the measured magnitude of the offset current is increased or decreased in a specific direction (S200).

In response to an increase in the magnitude of the offset current in a specific direction A, the magnetic pole of the stator formed by the current flowing in the specific direction A is detected to be different from the magnetic pole of the adjacent rotor. In contrast, in response to a decrease in the magnitude of the offset current in a specific direction B, the magnetic pole of the stator formed by the current flowing in the specific direction B is detected to be the same as the magnetic pole of the adjacent rotor (S300).

When the position of the magnetic pole of the rotor is detected, the rotor is aligned for initial driving of the BLDC motor. The magnetic pole of the stator is formed to be different from the magnetic pole of the rotor adjacent thereto, and the rotor is aligned by being rotated with a magnetic attractive force (S400).

When the rotor is aligned, the rotor is rotated using torque caused by the magnetic attractive force or repulsive force. For example, when the BLDC motor has an asymmetric air gap, if a magnetic repulsive force is applied to the aligned rotor, the rotor may always rotate in a specific direction C, and if a magnetic attractive force is applied to the aligned rotor, the rotor may always rotate in an opposite direction to the specific direction C. By rotating as described above, the BLDC motor may be initially driven (S500).

The method and the apparatus for detecting a position of a rotor magnetic pole of a single-phase BLDC motor may detect a position of a rotor magnetic pole so as to control initial driving of the motor without using a position detecting sensor such as a Hall sensor. Accordingly, manufacturing cost of the motor may be reduced.

Since the position of the rotor magnetic pole that controls the initial driving of the motor is detected without using a position detecting sensor (such as a Hall sensor), space for installing the position detecting sensor is not required at the time of manufacturing the motor. Therefore, the motor may be manufactured to be small.

Since a position detecting sensor (such as a Hall sensor) is not provided, the motor may be used without being restricted in terms of usage environment such as temperature or humidity.

Since a direction of increasing or decreasing the measured magnitude of the current is quickly and accurately measured using a filter, the position of the rotor magnetic pole can be quickly and accurately determined. Therefore, the motor may be quickly and accurately initially driven in a desired direction.

The present disclosure may be directed to addressing an issue associated with some related art in which the manufacturing cost of the motor is increased since a single-phase BLDC motor includes a position detecting sensor to detect a position of a rotor magnetic pole.

The present disclosure may be directed to addressing an issue associated with some related art in which the size of the motor is increased since a single-phase BLDC motor includes a position detecting sensor to detect a position of a rotor magnetic pole.

The present disclosure may be directed to addressing an issue associated with some related art in which, since a single-phase BLDC motor includes a position detecting sensor to detect a position of a rotor magnetic pole, the motor is faced with restrictions in usage environment (such as a temperature or humidity) in which the position detecting sensor can be used.

The present disclosure may be directed to addressing an issue associated with some related art in which, when the rotor magnetic pole position detecting method used by a sensor-less single-phase BLDC motor of the related art is used, a time for detecting a position of the rotor magnetic pole is prolonged, resulting in the motor not being precisely operated at a desired timing.

A method for detecting a rotor magnetic pole of a single-phase BLDC motor may detect a position of a rotor magnetic pole of the motor by applying a high frequency voltage to the motor and measuring a change in magnitude of a flowing current.

The method may include applying a high frequency voltage to a single-phase BLDC motor, eliminating a high frequency component of a current flowing in the single-phase BLDC motor using a high frequency eliminator and determining a fluctuation direction of a magnitude of the current over time, and detecting a position of a magnetic pole of a rotor of the motor based on a magnetic pole formed in a stator of the motor by the fluctuation direction of the magnitude of the current and a current flowing direction.

In the detecting a position of a magnetic pole of a rotor, in response to an increase in the magnitude of the current flowing in a specific direction, a magnetic pole formed in the stator by the current flowing in the specific direction is detected to be different from a magnetic pole of the rotor adjacent to the stator, and in response to a decrease in the magnitude of the current flowing in the specific direction, a magnetic pole formed in the stator by the current flowing in the specific direction is detected to be the same as the magnetic pole of the rotor adjacent to the stator.

The high frequency eliminator may be a filter.

The high frequency eliminator may be a low pass filter.

The high frequency eliminator may be a first order low pass filter.

The high frequency voltage may have a frequency of 500 Hz or higher and the high frequency eliminator may eliminate a component of the current having a frequency of 500 Hz or higher.

An apparatus for detecting a rotor magnetic pole of a single-phase BLDC motor may detect a position of a rotor magnetic pole of the motor by applying a high frequency voltage to the motor and measuring a change in magnitude of a flowing current.

The apparatus may include a high frequency applier configured to apply a high frequency voltage to a single-phase BLDC motor, a current analyzer configured to eliminate a high frequency component of a current flowing in the single-phase BLDC motor using a high frequency eliminator and determine a fluctuation direction of a magnitude of the current over time, and a magnetic pole detector configured to detect a position of a magnetic pole of a rotor of the motor based on a magnetic pole formed in a stator of the motor by the fluctuation direction of the magnitude of the current and a current flowing direction.

In response to an increase in the magnitude of the current flowing in the specific direction, the magnetic pole detector may detect a magnetic pole formed in the stator by the current flowing in a specific direction to be different from a magnetic pole of the rotor adjacent to the stator.

In response to a decrease in the magnitude of the current flowing in the specific direction, the magnetic pole detector may detect a magnetic pole formed in the stator by the current flowing in the specific direction to be the same as the magnetic pole of the rotor adjacent to the stator.

Detailed aspects of the various embodiments are included in the following detailed description and the drawings.

The method and the apparatus for detecting a position of a rotor magnetic pole of a single-phase BLDC motor may detect a position of a rotor magnetic pole so as to control initial driving of the motor without using a position detecting sensor such as a Hall sensor. Accordingly, manufacturing cost of the motor may be reduced.

Since the position of the rotor magnetic pole that controls the initial driving of the motor is detected without using a position detecting sensor such as a Hall sensor, space for installing the position detecting sensor is not required at the time of manufacturing the motor. Therefore, the motor may be manufactured to be small.

Since a position detecting sensor such as a Hall sensor is not provided, the motor may be used without being restricted in terms of usage environment such as temperature or humidity.

Since a direction of increasing or decreasing the measured magnitude of the current is quickly and accurately measured using a filter, the position of the rotor magnetic pole can be quickly and accurately determined. Therefore, the motor may be quickly and accurately initially driven in a desired direction.

There is no possibility of overcurrent, and a magnetic pole of the rotor may be quickly detected by a simple calculation.

Although the present disclosure has been described in detail with reference to the exemplary embodiments, those skilled in the art may understand that various modifications of the above-described embodiments can be made without departing from the scope of the present disclosure. Therefore, the scope of the present disclosure is not limited to the above-described embodiment but may be defined not only by the following claims, but also by all changes and modification derived from the claims and equivalent concepts.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for detecting information of a single-phase BLDC (brushless direct current) motor, the method comprising:
    applying a high frequency voltage to a single-phase BLDC motor;
    eliminating, by a high frequency eliminator, a high frequency component of a current flowing in the single-phase BLDC motor;
    determining a fluctuation direction of a magnitude of the current over time;
    determining a magnetic pole of a stator of the motor; and
    detecting a position of a magnetic pole of a rotor of the motor adjacent to the stator based on the magnetic pole of the stator, the determined fluctuation direction and a current flowing direction.

2. The method for detecting information of a single-phase BLDC motor of claim 1, wherein the detecting of the position comprises:
    in response to an increase in the magnitude of the current flowing in a first direction, detecting a magnetic pole of the rotor adjacent to the stator to be different from the magnetic pole of the stator.

3. The method for detecting information of a single-phase BLDC motor of claim 1, wherein the detecting of the position comprises:
    in response to an increase in the magnitude of the current flowing in a second direction, detecting a magnetic pole of the rotor adjacent to the stator to be the same as the magnetic pole of the stator.

4. The method for detecting information of a single-phase BLDC motor of claim 1, wherein the detecting of the position comprises:
    in response to a decrease in the magnitude of the current flowing in a first direction, detecting a magnetic pole of the rotor adjacent to the stator to be same as the magnetic pole of the stator.

5. The method for detecting information of a single-phase BLDC motor of claim 1, wherein the detecting of the position comprises:
in response to a decrease in the magnitude of the current flowing in a second direction, detecting the magnetic pole of the rotor adjacent to the stator to be different from the magnetic pole of the stator.

6. The method for detecting information of a single-phase BLDC motor of claim 1, wherein the high frequency eliminator is a filter.

7. The method for detecting information of a single-phase BLDC motor of claim 1, wherein the high frequency eliminator is a low pass filter.

8. The method for detecting information of a single-phase BLDC motor of claim 1, wherein the high frequency eliminator is a first order low pass filter.

9. The method for detecting a rotor magnetic pole of a single-phase BLDC motor of claim 1, wherein the high frequency voltage applied to the single-phase BLDC motor has a frequency of 500 Hz or higher, and the high frequency eliminator is to eliminate a component of the current having a frequency of 500 Hz or higher.

10. An apparatus for detecting information of a single-phase BLDC (brushless direct current) motor, the apparatus comprising:
a high frequency applier configured to apply a high frequency voltage to the single-phase BLDC motor;
a current analyzer configured to eliminate, by a high frequency eliminator, a high frequency component of a current flowing in the single-phase BLDC motor and to determine a fluctuation direction of a magnitude of the current over time; and
a magnetic pole detector configured to detect a position of a magnetic pole of a rotor of the motor adjacent to a stator of the motor based on a magnetic pole of the stator, the determined fluctuation direction and a current flowing direction.

11. The apparatus for detecting information of a single-phase BLDC motor of claim 10, wherein the magnetic pole detector is configured to:
in response to an increase in the magnitude of the current flowing in a first direction, detect a magnetic pole of the rotor adjacent to the stator to be different from the magnetic pole of the stator.

12. The apparatus for detecting information of a single-phase BLDC motor of claim 10, wherein the magnetic pole detector is configured to:
in response to an increase in the magnitude of the current flowing in a second direction, detect a magnetic pole of the rotor adjacent to the stator to be the same as the magnetic pole of the stator.

13. The apparatus for detecting information of a single-phase BLDC motor of claim 10, wherein the magnetic pole detector is configured to:
in response to a decrease in the magnitude of the current flowing in a first direction, detect a magnetic pole of the rotor adjacent to the stator to be same as the magnetic pole of the stator.

14. The apparatus for detecting information of a single-phase BLDC motor of claim 10, wherein the magnetic pole detector is configured to:
in response to a decrease in the magnitude of the current flowing in a second direction, detect the magnetic pole of the rotor adjacent to the stator to be different from the magnetic pole of the stator.

15. The apparatus for detecting information of a single-phase BLDC motor of claim 10, wherein the high frequency eliminator is a filter.

16. The apparatus for detecting information of a single-phase BLDC motor of claim 10, wherein the high frequency eliminator is a first order low pass filter.

17. The apparatus for detecting information of a single-phase BLDC motor of claim 10, wherein the high frequency voltage applied to the single-phase BLDC motor has a frequency of 500 Hz or higher, and the high frequency eliminator is to eliminate a component of the current having a frequency of 500 Hz or higher.

18. An apparatus for detecting information of a single-phase BLDC (brushless direct current) motor, the apparatus comprising:
a high frequency applier configured to apply a high frequency voltage to a single-phase BLDC motor;
a first order low pass filter to filter a current flowing in the motor;
a measuring device configured to measure the current that passes through the first order low pass filter; and
a current analyzer configured to determine a fluctuation direction of a magnitude of the current over time, based on the measured current.

19. The apparatus for detecting information of a single-phase BLDC motor of claim 18, comprising:
a magnetic pole detector configured to detect a position of a magnetic pole of a rotor of the motor adjacent to a stator of the motor based on a magnetic pole of the stator, the determined fluctuation direction and a current flowing direction.

* * * * *